(12) United States Patent
Yoo et al.

(10) Patent No.: US 11,783,639 B2
(45) Date of Patent: Oct. 10, 2023

(54) LIVENESS TEST METHOD AND APPARATUS

(71) Applicant: SAMSUNG ELECTRONICS CO., LTD., Suwon-si (KR)

(72) Inventors: Byungin Yoo, Seoul (KR); Youngjun Kwak, Seoul (KR); Jungbae Kim, Seoul (KR); Jinwoo Son, Seoul (KR); Changkyo Lee, Seoul (KR); Chang Kyu Choi, Seongnam-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 304 days.

(21) Appl. No.: 16/998,172

(22) Filed: Aug. 20, 2020

(65) Prior Publication Data

US 2020/0410215 A1 Dec. 31, 2020

Related U.S. Application Data

(63) Continuation of application No. 16/148,587, filed on Oct. 1, 2018, now Pat. No. 10,789,455, which is a
(Continued)

(30) Foreign Application Priority Data

Aug. 23, 2016 (KR) .................. 10-2016-0106763

(51) Int. Cl.
*G06V 40/40* (2022.01)
*G06V 40/16* (2022.01)
(Continued)

(52) U.S. Cl.
CPC ............. *G06V 40/40* (2022.01); *G06F 21/32* (2013.01); *G06N 3/04* (2013.01); *G06N 3/08* (2013.01);
(Continued)

(58) Field of Classification Search
CPC .... G06F 21/32; G06V 40/161; G06V 40/168; G06V 40/18; G06V 40/40; G06V 40/45
See application file for complete search history.

(56) References Cited

U.S. PATENT DOCUMENTS 7,508,960 B1  3/2009 Bolle et al.
7,668,350 B2  2/2010 Rowe
(Continued)

FOREIGN PATENT DOCUMENTS

KR 10-2008-0037447 A 4/2008
KR 10-2010-0073191 A 7/2010
(Continued)

OTHER PUBLICATIONS

Määttä et al. "Face Spoofing Detection from Single Images Using Micro-Texture Analysis." IEEE Biometrics Compendium, IEEE RFIC Virtual Journal, IEEE RFID Virtual Journal, Oct. 11, 2011, pp. 1-7 (Year: 2011).*
Tan et al. "Automated Detection of Spoof Iris Images Using Local Texture Analysis." Technical Report: COMP-K-13, Nov. 2013, pp. 1-4.
J. Yang, et al. "Learn Convolutional Neural Network for Face Anti-Spoofing." Computer Vision and Pattern Recognition, Aug. 2014, p. 1-8.
(Continued)

*Primary Examiner* — Jon Chang
(74) *Attorney, Agent, or Firm* — NSIP Law

(57) ABSTRACT

A liveness test method and apparatus is disclosed. A processor implemented liveness test method includes extracting an interest region of an object from a portion of the object in an input image, performing a liveness test on the object using a neural network model-based liveness test model, the liveness test model using image information of the interest region as provided first input image information to the liveness test model and determining liveness based at least on extracted texture information from the information of the interest region by the liveness test model, and indicating a result of the liveness test.

11 Claims, 10 Drawing Sheets

Related U.S. Application Data continuation of application No. 15/656,350, filed on Jul. 21, 2017, now Pat. No. 10,121,059.

(51) Int. Cl.

| | | |
|---|---|---|
| *G06V 40/18* | (2022.01) | |
| *G06F 21/32* | (2013.01) | |
| *G06Q 20/40* | (2012.01) | |
| *G06V 40/12* | (2022.01) | |
| *G06N 3/04* | (2023.01) | |
| *G06N 3/08* | (2023.01) | |
| *G06V 40/14* | (2022.01) | |

(52) U.S. Cl.
CPC ... *G06Q 20/40145* (2013.01); *G06V 40/1382* (2022.01); *G06V 40/161* (2022.01); *G06V 40/168* (2022.01); *G06V 40/172* (2022.01); *G06V 40/18* (2022.01); *G06V 40/1388* (2022.01); *G06V 40/14* (2022.01); *G06V 40/193* (2022.01); *G06V 40/45* (2022.01)

(56) References Cited

U.S. PATENT DOCUMENTS

| | | | |
|---|---|---|---|
| 8,064,688 | B2 | 11/2011 | Schneiderman |
| 8,090,163 | B2 | 1/2012 | Schuckers et al. |
| 8,437,513 | B1 | 5/2013 | Derakhshani et al. |
| 8,798,336 | B2 | 8/2014 | Nechyba et al. |
| 8,856,541 | B1 | 10/2014 | Chaudhury et al. |
| 9,767,358 | B2 | 9/2017 | Xue et al. |
| 9,965,610 | B2 * | 5/2018 | Chandraker ......... G06V 40/161 |
| 10,121,059 | B2 * | 11/2018 | Yoo ..................... G06V 40/161 |
| 10,789,455 | B2 * | 9/2020 | Yoo ....................... G06V 40/18 |
| 2008/0253625 | A1 | 10/2008 | Schuckers et al. |
| 2014/0270419 | A1 | 9/2014 | Schuckers et al. |
| 2014/0283113 | A1 | 9/2014 | Hanna |
| 2015/0261999 | A1 † | 9/2015 | Thiebot |
| 2016/0001941 | A1 | 1/2016 | Komogortsev |
| 2016/0019421 | A1 | 1/2016 | Feng et al. |
| 2016/0088241 | A1 | 3/2016 | Sung et al. |
| 2016/0267395 | A1 | 9/2016 | Julian et al. |
| 2017/0345146 | A1 | 11/2017 | Fan et al. |
| 2018/0276488 | A1 | 9/2018 | Yoo et al. |

FOREIGN PATENT DOCUMENTS

| | | |
|---|---|---|
| KR | 10-2011-0102073 A | 9/2011 |
| KR | 10-2013-0120810 A | 11/2013 |
| KR | 10-2015-0128510 A | 11/2015 |
| KR | 10-2016-0091114 A | 8/2016 |

OTHER PUBLICATIONS

Dohnalek. "Liveness Detection on Fingers Using Vein Pattern." Master Thesis, BRNO University of Technology, 2015, 60 pages.

D. Wen, et al. "Face Spoof Detection with image distortion analysis." IEEE Transactions on Information Forensics and Security, vol. 10, No. 4, Feb. 2015, p. 1-16.

Menotti, David, et al. "Deep Representations for Iris, Face, and Fingerprint Spoofing Detection." *IEEE Transactions on Information Forensics and Security* 10.4 2015, (pp. 864-879).

Xu, Zhenqi, et al. "Learning Temporal Features Using LSTM-CNN Architecture for Face Anti-Spoofing." Pattern Recognition (ACPR), *3rd IAPR Asian Conference* on. IEEE, 2015 (pp. 141-145).

Wang, Chenggang, et al. "A DCNN Based Fingerprint Liveness Detection Algorithm with Voting Strategy." *Chinese Conference on Biometric Recognition.* Springer, Cham, 2015 (pp. 241-249).

Nogueira et al. "Fingerprint Liveness Detection Using Convolutional Neural Networks." IEEE Transactions on Information and Security, Vo. 11, No. 6, pp. 1206-1213.

Extended European Search Report dated Dec. 21, 2017 in corresponding European Patent Application No. 17180799.3 (6 pages in English).

Alotaibi et al. "Enhancing Computer Vision to Detect Face Spoofing Attack Utilizing a Single Frame from a Replay Video Attack Using Deep Learning." International Conference on Optoelectronics and Image Processing, Jun. 10, 2016, pp. 1-5 (Year: 2016).

Yang, Jianwei, et al. "Face Liveness Detection with Component Dependent Descriptor." 2013 International Conference on Biometrics (ICB). IEEE, 2013, (6 pages in English).

Lai, ChinLun, and ChiuYuan Tai. "A Smart Spoofing Face Detector by Display Features Analysis." sensors 16.7 (2016): 1136, (15 pages in English).

Extended European search report dated Mar. 22, 2022, in counterpart European Patent Application No. 21212049.7 (6 pages in English).

Japanese Office Action dated Jun. 22, 2021, in counterpart Japanese Patent Application No. 2017-148957 (2 pages in English and 4 pages in Japanese).

Korean Office Action dated Sep. 13, 2022, in counterpart Korean Patent Application No. 10-2016-0106763 (6 pages in English and 9 pages in Korean).

MiYoung Nam, Facial Landmark Detection System using Interest-region Model and Edge Energy Function, p. 2580-2584, Dec. 4, 2004, https://ieeexplore.ieee.org/document/5346730, San Antonio, TX, USA.†

\* cited by examiner
† cited by third party

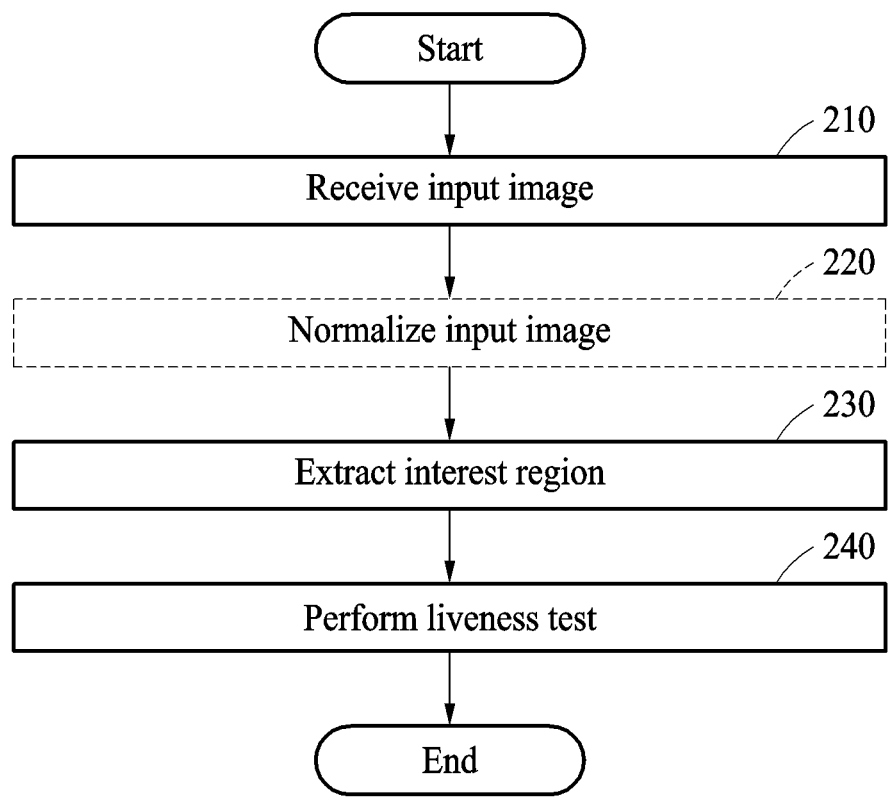

LIVENESS TEST METHOD AND APPARATUS

CROSS-REFERENCE TO RELATED APPLICATION

This application is a continuation of U.S. patent application Ser. No. 16/148,587 filed on Oct. 1, 2018, now U.S. Pat. No. 10,789,455 issued Sep. 29, 2020, which is a continuation of U.S. patent application Ser. No. 15/656,350 filed on Jul. 21, 2017, now U.S. Pat. No. 10,121,059 issued on Nov. 6, 2018, which claims the benefit under 35 USC § 119(a) of Korean Patent Application No. 10-2016-0106763 filed on Aug. 23, 2016, in the Korean Intellectual Property Office, the entire disclosure of which is incorporated herein by reference for all purposes.

BACKGROUND

1. Field

The following description relates to a method and apparatus detecting liveness of an object.

2. Description of Related Art

In a user recognition system, a computing apparatus may determine whether to allow a user to have access to the computing apparatus based on authentication information provided by the user. The authentication information may include, for example, a password to be input by the user and biometric information of the user. The biometric information may include, for example, information associated with a fingerprint, an iris, and a face of the user.

Recently, face anti-spoofing technology has been attracting a growing interest as a security method for the user recognition system. A face spoof may be considered a type of an attack using an image, a video, or a mask, and thus identifying such an attack or counteracting the acceptance of the same as being genuine may be desirable. Accordingly, a face anti-spoofing technology may determine whether a face of a user input to the computing apparatus is a fake face or a genuine face. For the determination, extraction of features, such as, for example, through 'hand-crafted' analyses of local binary patterns (LBP), a histogram of oriented gradients (HoG), and a difference of Gaussians (DoG), may be performed to determine whether the input face is fake or genuine. Such feature extraction analyses are considered 'hand crafted' because they require each system to be manually designed for the corresponding circumstance or implementation.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, a processor implemented liveness test method includes extracting an interest region of an object from a portion of the object in an input image, performing a liveness test on the object using a neural network model-based liveness test model, the liveness test model using provided image information of the interest region as first input image information to the liveness test model and determining liveness based at least on extracted texture information from the image information of the interest region by the liveness test model, and indicating a result of the liveness test.

The liveness test model may use image information of the input image or image information of the portion of the object in the input image as provided second input image information to the liveness test model that is also provided the first input image information, and the determining of the liveness may be based at least on the extracted texture information from the first input image information and spatial information extracted based on the second input image information by the liveness test model.

The method may further include adjusting a pixel size of at least the image information of the portion of the object in the input image, after the extracting of the interest region, to generate the second input image information.

An effective resolution of the first input image information may be higher than an effective resolution of the second input image information.

A pixel size of the first input image information may be equal to a pixel size of the second input image information.

The liveness test model may include a recurrent connection structure that is configured so a determination of liveness of the object, with respect to the input image being a current frame, is dependent on results of the liveness test model obtained with respect to a previous frame.

The first input image information and the second input image information may be input to the liveness test model through different input layers of the liveness test model.

The liveness test model may independently perform filtering on the first input image information and the second input image information before performing further filtering on a combination of information of results from both the performed filtering on the first input image information and the performed filtering on the second input image information.

The extracting of the interest region may include extracting a select portion including a pupil region as the interest region from the portion of the object in the input image.

The liveness test model may use image information of the portion of the object in the input image, within a facial region of the object and including the select portion, as provided second input image information to the liveness test model that is also provided the first input image information, and the determining of the liveness may be based at least on the extracted texture information from the select portion and spatial information extracted based on the second input image information by the liveness test model.

The extracting of the interest region may include extracting a select portion, from the portion of the object in the object in the input image, including two eyes or at least two of an eye, a nose, and lips as respective interest regions.

The extracting of the interest region may include extracting respective select portions, from the portion of the object in the input image, including at least one of an eye, a nose, or lips as the interest region.

The liveness test model may use image information of the portion of the object in the input image, within a facial region of the object and including one or more of the respective select portions, as provided second input image information to the liveness test model that is also provided the first input image information, and the determining of the liveness may be based at least on extracted texture information from the one or more of the respective select portions by the liveness test model and spatial information extracted based on the second input image information by the liveness test model.

The extracting of the interest region may include extracting respective one or more select portions, from a fingerprint region as the portion of the object in the input image, as respective interest regions.

The liveness test model may use image information of the portion of the object in the input image, as provided second input image information to the liveness test model that is also provided the first input image information, and the determining of the liveness may be based at least on extracted texture information from the respective one or more select portions by the liveness test model and spatial information extracted based on the second input image information by the liveness test model.

The extracting of the interest region may include extracting a select portion, from a vein region as the portion of the object in the input image, as the interest region.

The liveness test model may use image information of the portion of the object in the input image, as provided second input image information to the liveness test model that is also provided the first input image information, and the determining of the liveness may be based at least on the extracted texture information from the select portion and spatial information extracted based on the second input image information by the liveness test model.

The method may further include normalizing the input image, and the extracting of the interest region may include extracting the interest region of the object from the normalized input image.

The extracting of the interest region may include detecting feature points in the input image to determine the portion of the object in the input image, and determining the interest region based on the detected feature points.

A location of the interest region may be determined based on a determined type of biometric information for which the liveness test is determined to be performed.

The method may further include selectively controlling access to functions of a computing apparatus based on results of the performed liveness test.

In one general aspect, there is provided a non-transitory computer-readable storage medium storing instructions, that when executed by a processor, cause the processor to perform one or more or all operations described herein.

In one general aspect, a liveness test computing apparatus includes at least one processor configured to extract an interest region of an object from a portion of the object in an input image, and perform a liveness test on the object using the neural network model-based liveness test model, the liveness test model using image information of the interest region as provided first input image information to the liveness test model and configured to determine liveness based at least on extracted texture information from the image information of the interest region by the liveness test model.

The liveness test computing apparatus may further include a memory connected to the processor, and the memory may store trained weighting information of the liveness test model.

The liveness test model may be configured to use image information of the input image or image information of the portion of the object in the input image as provided second input image information to the liveness test model that is also provided the first input image information, with a pixel size of at least the image information of the portion of the object in the input image being adjusted after the extracting of the interest region to generate the second input image information, the apparatus may be configured to provide a reference value indicating a result of the liveness determination, and the determining of the liveness may be based at least on the extracted texture information from the first input image information and spatial information extracted based on the second input image information by the liveness test model.

The liveness test computing apparatus may be further configured to input the first input image information and the second input image information to the liveness test model through different configured input layers of the liveness test model.

The liveness test model may be configured to independently perform filtering on the first input image information for extracting the texture information and filtering on the second input image information for extracting the spatial information before performing further filtering on a combination of information of results from both the performed filtering on the first input image information and performed filtering on the second input image information.

The liveness test model may include a recurrent connection structure that is configured so a determination of liveness of the object, with respect to the input image being a current frame, is dependent on results of the liveness test model obtained with respect to a previous frame.

The processor may be further configured to selectively controlling access to functions of the liveness test computing apparatus based on results of the performed liveness test.

In a general aspect, a liveness test computing apparatus includes at least one processor configured to extract an interest region of an object within a detected face region in an input image, perform a liveness test on the object using a convolutional neural network by providing a first input layer of the convolutional neural network image information of the interest region as first input image information and determining liveness based at least on texture information extracted from the image information of the interest region through a first convolutional layer of the convolutional neural network, and selectively control access to other functions of the liveness test computing apparatus based on results of the performed liveness test.

The liveness test computing apparatus may be a mobile phone, tablet, or personal computer and the other functions include at least access to information stored in a memory of the liveness test computing apparatus.

The processor may be configured to provide a second input layer of the convolutional neural network second input image information corresponding to the detected face region, with a pixel size of at least image information of the face region being adjusted after the extracting of the interest region to generate the second input image information, and the determining of the liveness may be based at least on the extracted texture information from the first input image information and spatial information extracted from the second input image information through a second convolutional layer of the convolutional neural network independent of the first convolutional layer.

The convolutional neural network may further include a third convolutional layer configured to perform filtering on a combination of results dependent on filtering by the first convolutional layer and results dependent on filtering by the second convolutional layer.

Other features and aspects will be apparent from the following detailed description, the drawings, and the claims.

BRIEF DESCRIPTION OF THE DRAWINGS

FIG. 2 is a flowchart illustrating an example of a liveness test method.

Figure 1A:
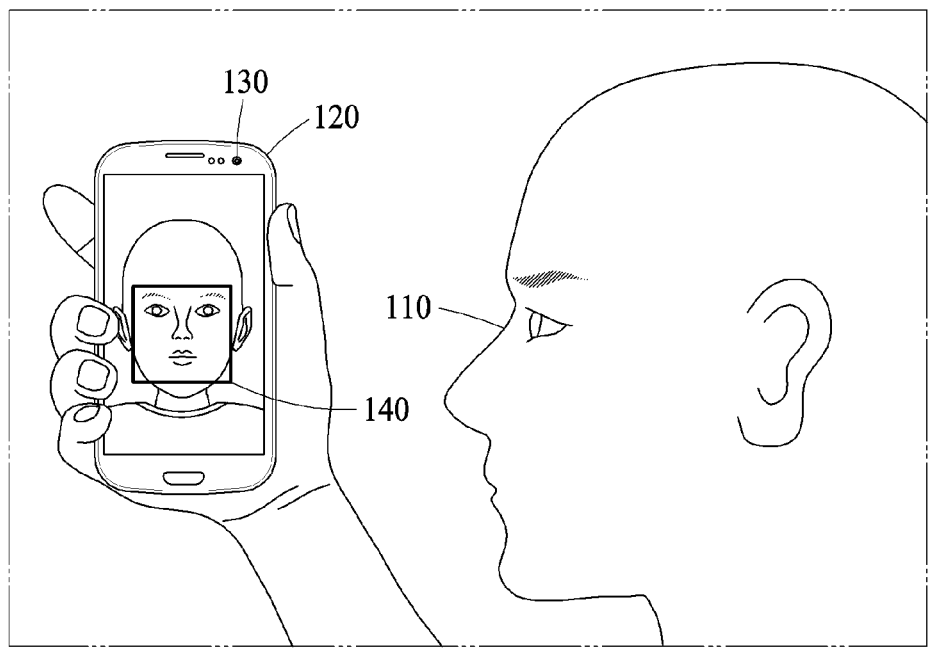
FIGS. 1A through 1D are diagrams illustrating examples of liveness tests.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, examples are described in detail with reference to the accompanying drawings.

FIGS. 1A through 1D are diagrams illustrating examples of liveness test.

A liveness test, or used interchangeably with liveness detection, is used to detect whether an object is live or not, for example, whether a face captured using a camera is a genuine face or a fake face. The term "liveness" described herein is used to distinguish a living object from a lifeless object, for example, a photo or an image, and a replica used for fakery. Depending on embodiment, one or more liveness tests described herein may be used to detect liveness of a target for which user authentication is to be performed in user login, mobile payment, access control, and the like. The liveness test may thus filter out, or block, an attempt for the authentication, for example, a spoofing attack made using a substitute, for example, an image, a video, a mask, and a replica, and thus prevent erroneous authentication. In addition, being data driven, the liveness test may be implemented more accurately and be more readily available, such as in requiring less processing resources, than previous hand-crafted spoof prevention techniques.

FIG. 1A is a diagram illustrating an example of facial recognition being performed on a computing apparatus 120 according to one or more embodiments. Referring to FIG. 1A, a liveness test apparatus is included in the computing apparatus 120, or is represented by the computing apparatus 120. The computing apparatus 120 authenticates a user 110 who makes an attempt for an access to the computing apparatus 120 through facial recognition. For example, the user 110 may make such an attempt for user authentication in the computing apparatus 120 to unlock the computing apparatus 120, and the computing apparatus 120 may capture a face image of the user 110 using an image capturing device, for example, a camera 130, and analyze the obtained face image to allow or reject authenticating the user 110. The computing apparatus 120 may determine whether to authenticate the user 110 by comparing the obtained face image to a preregistered image. The computing apparatus 120 may be, for example, a smartphone, a wearable device, a tablet computer, a mini-laptop (netbook), a laptop, a desktop, a personal digital assistant (PDA), a set-top box, a television (TV), a biometrics-based door lock, a security device, and a vehicle start device.

As illustrated in FIG. 1A, when the computing apparatus 120 operates in a lock mode, the computing apparatus 120 may authenticate the user 110 through the facial recognition.

For example, when the user 110 is an authorized user, the user 110 may cancel the lock mode of the computing apparatus 120 through the facial recognition performed by the computing apparatus 120. The user 110 may register or store, in advance, a face image of the user 110 in the computing apparatus 120, and the computing apparatus 120 may store, in a storage or a cloud storage, a registered face image of the user 110 obtained by capturing a face of the user 110.

To unlock the computing apparatus 120, the user 110 may capture a face image including at least a portion of the face of the user 110 through the computing apparatus 120. For another example, the user 110 may alternatively be an unauthorized user and be attempting to unlock the computing apparatus 120 by causing erroneous authentication in the computing apparatus 120 using a spoofing technique. For example, the unauthorized user, may present, to the camera 130, an image on which a face of an authorized user is printed or a replica in a form of the face of the authorized user in order to cause the erroneous authentication. Here, the liveness test apparatus may prevent the erroneous authentication that may be caused by such a fakery and spoofing technique in previous anti-spoofing techniques. The liveness test apparatus may detect an attempt for authentication that is suspicious as fakery, and effectively prevent fakery-based erroneous authentication.

In one example, the liveness test apparatus may perform a liveness test using information of a portion of an image obtained by the camera 130, which is considered important for the liveness test, in lieu of an entire region of the image. For example, as illustrated in FIG. 1, the liveness test apparatus may extract an interest region of the user's body (or a region of interest [ROI]), for example, an eye, a nose, and lips, as a portion of and from within a face region 140, and perform the liveness test on an object based on texture information of the extracted interest region. The liveness test apparatus may use only the information of the extracted portion to reduce resources and an amount of calculation or computation by a liveness test model that implements the liveness test and detect liveness of the object more rapidly. Here, if the entire region of the image were extracted instead of the interest region(s), the corresponding image data may be required to be downsampled to a lower pixel resolution for liveness test analyses, or the computations of the full entire region at full resolution may demand too much processing resources and could not be able to be implemented in real time, compared to the above liveness test apparatus approach according to one or more embodiments that selectively considers such interest region(s), which may use less processing resources and thus may be available for mobile devices, and which may be implemented in real time. In addition, such entire region analyses approaches may result in lower accuracies than the above liveness test apparatus approach according to one or more embodiments, as the entire region analyses approaches would only be able to consider spatial information due to the lower pixel resolution, while the above liveness test apparatus approach according to one or more embodiments may consider texture and spatial feature information. Still further, such entire region analyses approaches may require extensive training resources or be unable to be successfully trained, compared to the above liveness test approach according to one or more embodiments.

In another example, the liveness test apparatus may also perform the liveness test using information of a larger portion of the image or another image obtained by the camera 130, and thus perform the liveness test based on global shape information of the object indicated in the face region 140, in addition to the texture information of the interest region. For example, the global shape information of the object may be focused on, or limited to, shape information of the body area from which the interest region is extracted, though embodiments are not limited thereto. Thus, the liveness test apparatus may detect the liveness more accurately based on the texture information and the shape information using information from both the extracted interest region and a global region within the captured image.

In still another example, the liveness test apparatus may perform the liveness test based on a texture, a shape, and a movement characteristic of the object based on a lapse of time, which are indicated in the face region 140. The liveness test apparatus may extract at least one interest region from within the face region 140, and detect the liveness based on texture information of the interest region, shape information indicated in the face region 140, and movement information of the object based on a lapse of time. Based on such various types of information, the liveness test apparatus may detect whether the object is fake or genuine more accurately. A difference may be present between a fake object and a live object in terms of a texture, a shape, and a movement based on a lapse of time, and thus the liveness test apparatus may determine such a difference and determine liveness of an object more accurately using the determined difference.

For performing the liveness test on the object, the liveness test apparatus may use a neural network-based liveness test model, for example. The liveness test model refers to a model that may output a reference value that indicates the liveness of the object based on input information. The liveness test model may intuitively determine the liveness of the object, such as by being pre-trained based on training data, and thus data driven. The liveness test apparatus may determine whether the object is a fake object or a live object based on the reference value output from the liveness test model. For example, the output reference value may be a probability value, indicating the probability of the object being a fake or live object, or merely a corresponding binary classification indication, for example.

When the liveness test apparatus determines that the face of the user 110 captured by the camera 130 is not a fake but a genuine one, the computing apparatus 120 may then perform further user authentication to determine whether the user 110 is a registered user by comparing the obtained face image to a preregistered image, such as through use of further facial recognition operations. When the user authentication is successful, the user 110 may successfully unlock the computing apparatus 120. Conversely, when the user authentication is unsuccessful, the user 110 may not unlock the computing apparatus 120 and the computing apparatus 120 may continuously operate in the lock mode. When the liveness test apparatus determines that the face of the user 110 captured by the camera 130 is fake, the computing apparatus 120 may not proceed to the further user authentication and thus not perform the facial recognition, and may rather reject an access by the user 110 to the computing apparatus 120.

According to examples described herein, more accurately detecting liveness of an object may reduce a possibility of erroneous authentication that may be caused by fakery. In addition, based on a result of the detecting of the liveness, whether to perform further user authentication including facial recognition may first be determined, and thus resources and power consumption typically needed for the further user authentication may be reduced.

Figure 1B:
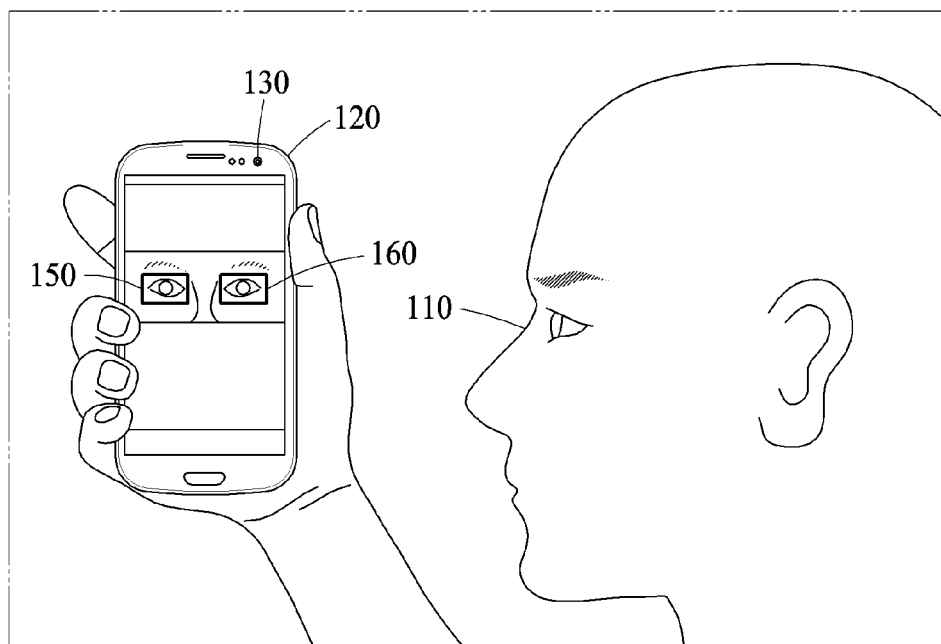

FIG. 1B is a diagram illustrating an example of iris recognition. Referring to FIG. 1B, the computing apparatus 120 authenticates the user 110 who makes an attempt for an access to the computing apparatus 120 through iris recognition. An iris region of the user 110 is selectively captured or cropped by the camera 130 or an iris recognition sensor, and the computing apparatus 120 allows or rejects authenticating the user 110 by analyzing biometric information of the iris region in the obtained image using a liveness test model. As illustrated in FIG. 1B, the liveness test apparatus detects at least one eye region, for example, an eye region 150 and an eye region 160, in the obtained image, extracts an interest region including the eye regions 150 and 160 and less than the whole face, and detects liveness of the user 110 based on information of the extracted interest region.

Figure 1C:
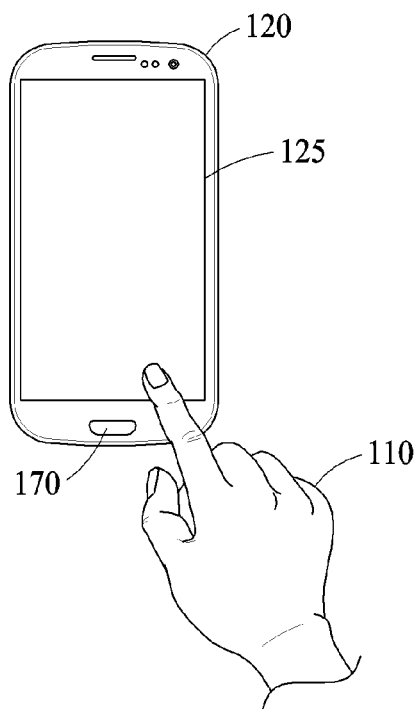

FIG. 1C is a diagram illustrating an example of fingerprint recognition. Referring to FIG. 1C, the computing apparatus 120 authenticates the user 110 who makes an attempt for an access to the computing apparatus 120 through fingerprint recognition. A fingerprint of the user 110 is captured through a camera or a fingerprint recognition sensor. For example, as illustrated in FIG. 1C, the fingerprint is captured when the user 110 touches a display 125, captured through the fingerprint recognition sensor embedded in a home button 170, or otherwise captured. The computing apparatus 120 determines whether to authenticate the user 110 by analyzing biometric information of a fingerprint pattern in the obtained fingerprint image using a liveness test model. Here, the liveness test apparatus may extract an interest region in which a characteristic of the fingerprint pattern is conspicuous from the fingerprint image, and detect liveness of the user 110 based on information of the extracted interest region which is less than the whole fingerprint region.

Figure 1D:
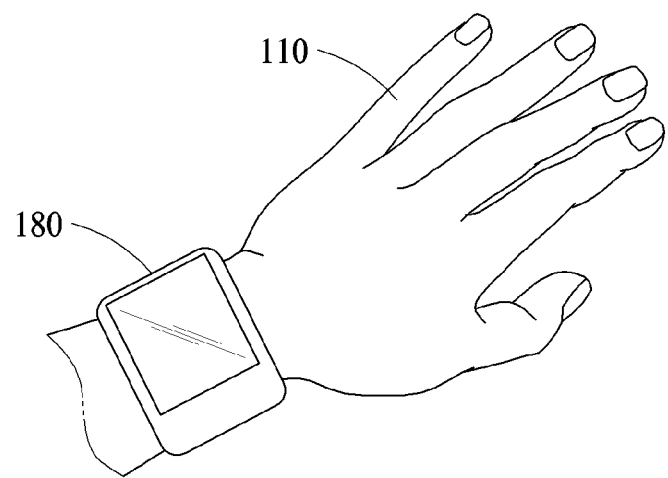

FIG. 1D is a diagram illustrating an example of vein pattern recognition (VPR). Referring to FIG. 1D, a computing apparatus 180, which is provided as a watch-type wearable device, authenticates the user 110 who makes an attempt for an access to the computing apparatus 180 through VPR. When the user 110 wears the computing apparatus 180 around a wrist of the user 110, for example, and makes an attempt for authentication to have an access to the computing apparatus 180 and/or another computing device in communication with the computing apparatus 180, a light source embedded in the computing apparatus 180 may radiate infrared light towards skin of the user 110 and the infrared light reflected by hemoglobin in a vein of the user 110 may be recorded in a charge-coupled device (CCD) camera embedded in the computing apparatus 180. The computing apparatus 180 may determine whether to authenticate the user 110 by analyzing biometric information of a vascular pattern indicated in a vein image captured by the CCD camera using a liveness test model. Here, the liveness test apparatus may extract an interest region in which a characteristic of the vascular pattern is conspicuous from the obtained vein image, and detect liveness of the user 110 making the attempt for the authentication based on information of the extracted interest region which is less than the whole vein image.

Hereinafter, a method of performing a liveness test on an object by a liveness test apparatus will be described in more detail with reference to the accompanying drawings.

FIG. 2 is a flowchart illustrating an example of a liveness test method.

Referring to FIG. 2, in operation 210, a liveness test apparatus receives an input image. The input image may include at least one of a still image or a video image including a plurality of image frames. The input image may be a color image, a black-and-white image, or an infrared image, for example. The input image may include biometric information of, for example, a face, an iris, a fingerprint, and a vein of a user. For example, in iris recognition, an infrared image obtained by capturing an iris region may be input to the liveness test apparatus.

In operation 220, the liveness test apparatus may normalize the input image. For example, after receiving the input image, the liveness test apparatus may rotate, scale up or down, or crop the input image. The liveness test apparatus may also perform various image preprocessing methods on the input image in the alternate or in addition to the rotating, the scaling up or down, or the cropping. Such image preprocessing methods may include, for example, conversion of brightness or color, and removal of an artifact or a blur. Depending on embodiment, operation 220 may or may not be included in the liveness test method, or operation 220 may be selectively performed.

In operation 230, the liveness test apparatus extracts an interest region of an object from the input image, or the normalized input image. A shape and a size of the interest region of the object to be extracted may not be limited to a specific shape and size, but is a portion of the image and representative of a portion of the imaged object. The interest region refers to a region of the object that may be useful for the liveness test on the object based on a type of biometric information or type of biometric authentication, and includes a feature determined or predetermined to be significant in the determination of liveness of the object. For example, in facial recognition, the liveness test apparatus may extract, as an interest region, a select portion of the object including at least one of an eye, a nose, and lips from a whole of the imaged face region of a user in the input image. In an example, the interest region may be determined so as to respectively include substantially only the example one eye, the nose, or the lips, for example. For the facial recognition, a nose region, an eye region, and a lips region of the user may provide a valuable clue to determination of liveness of the user, e.g., compared to other facial regions, when the liveness determination is made by a liveness test model of the liveness test apparatus.

For another example, in iris recognition, the liveness test apparatus may extract a portion including a pupil region as an interest region from an eye region of a user in an input image. For example, the extracted interest region may be determined so as to include substantially only the pupil region of the eye region, for example. For the iris recognition, a corneal reflex appearing in the pupil region and image information of a neighboring region of the corneal reflex may provide a clue to determination of liveness of the user.

In one example, the liveness test apparatus may detect feature points, such as, for example, facial landmarks, of a face in an input image, and determine an interest region based on the detected feature points. The liveness test apparatus may detect a global region, e.g., within the input image, based on the feature points, and extract the interest region based on feature points detected within the global region. The global region may be a region smaller than an entire region of the input image, but greater than the interest region. For example, in the facial recognition, a face region from which a background region is excluded may be detected as the global region. For example, a global image of the global region may be determined so as to substantially only include the face region, with an interest image of the interest region being a portion within the global image. For another example, in the iris recognition, an eye region may be detected as the global region. The eye region may be determined so as to include substantially only one eye or both eyes, for example. Here, other facial component regions including, for example, a nose, lips, and eyebrows, may be excluded from the example global region. The liveness test apparatus may also determine the interest region in the input image using a visually salient region detecting method. However, examples are not limited thereto.

For still another example, in fingerprint recognition, the liveness test apparatus may extract a portion from a fingerprint pattern including a select fingerprint region as an interest region from an input image including the fingerprint pattern. For example, the liveness test apparatus may extract, as the interest region, a select portion of the fingerprint region in which a change in the fingerprint pattern is determined conspicuous. For example, the liveness test apparatus may extract, as the interest region, a portion in which feature points, for example, an ending point of a ridge, a bifurcation point, a core point, and a delta point, are concentrated, from an entire fingerprint region in the input image.

For yet another example, in VPR, the liveness test apparatus may extract a portion including a vein region as an interest region from an input image including a vein distribution pattern. For example, the liveness test apparatus may extract, as the interest region, a portion including a vein pattern of a wrist from an entire hand region or vein distribution pattern in the input image, or a portion of the vein distribution pattern in which one of an end and a bifurcation point of a blood vessel is intensively distributed in the vein distribution pattern.

In operation 240, the liveness test apparatus performs a liveness test on the object based on the interest region. The liveness test apparatus may perform the liveness test on the object using a neural network model-based liveness test model that uses image information of the interest region as an input. The image information of the interest region may thus include texture information as the pixel values of the pixels included in the interest region, for example, the respective color values and brightness values. The liveness test model may be pre-trained through a supervised learning method and perform nonlinear mapping, and thus may perform desirably in distinguishing differences in the liveness test.

In one example, the liveness test model may use the image information of the interest region as an input, and the liveness test apparatus may determine the liveness of the object based on an output value of the liveness test model. The liveness test apparatus may reduce resource consumption and an amount of calculation or computation by performing the liveness test based on a partial interest region in lieu of an entire region of the input image. Thus, when trained, the liveness test model may output a reference value to indicate the liveness based on intuitively observed local texture information indicated in the interest region.

In another example, the liveness test model may use the image information of the interest region as a first input, and use image information of the input image of which a size is adjusted as a second input. For example, the size or dimensions of image information of the interest region may be maintained, such as by cropping the interest region from the input image, and then the size or dimensions of the input image may be adjusted to be the same as a size or dimensions of the interest region, which may result in a re-scaling or down-sampling of the original resolution of the input image. Thus, the effective resolution of the interest region may be greater (or higher) than the effective resolution of the resized input image. Image information of the input image of which the size is adjusted may include shape information that may be beneficial for the liveness test. The input image may correspond to the aforementioned global image, e.g., less than a whole captured image. Accordingly, compared to previous approaches, interest regions of a body that may provide liveness clues can be used, such as with a highest captured resolution, so texture indicating information may be maintained and discernable by the liveness test model for each input image. In addition, though the whole input image or the global image may be down-scaled or downsampled, at least spatial features can be considered from each input image. Thus, as demonstrated in the below example of FIG. 4B, by considering the interest region and the input image or global image, both texture and spatial features may be observed and considered by the liveness test model for a single input image. Likewise, as demonstrated in the below example of FIG. 4A, by considering the interest region with sufficient resolution, textures of the interest region may be considered by the liveness test model for a single image. As the interest region has already been determined by the liveness test apparatus as a select region that provides a clue regarding liveness, the resolution of the select interest region may be maintained for such a texture analysis of the select interest region, e.g., independent of select spatial or texture analyses that may or may not be performed on the input image without the maintained resolution, thereby performing liveness test analyses on the input image without undue computational requirements. The liveness test model may output the reference value to indicate the liveness based on the local texture information indicated in the interest region and global shape information indicated in the input image of which the size is adjusted.

The liveness test model may output, as the reference value, at least one of a first probability value of the object in the input image being a fake object and a second probability value of the object in the input image being a live object. The liveness test apparatus may determine whether the object in the input image is live or fake based on the reference value. For example, when the first probability value is provided as an output by the liveness test model, the liveness test apparatus may determine the object to be a fake object in response to the first probability value being greater than a threshold value, and to be a live object in response to the first probability value being less than or equal to the threshold value. For another example, when the second probability value is provided as an output by the liveness test model, the liveness test apparatus may determine the object to be a live object in response to the second probability value being greater than a threshold value, and to be a fake object in response to the second probability value being less than or equal to the threshold value. For still another example, when both the first probability value and the second probability value are provided as outputs by the liveness test model, the liveness test apparatus may determine a final probability value based on a relational equation between the first probability value and the second probability value, and determine whether the object is fake or live by comparing the final probability value to a threshold value. Here, the first probability value and the second probability values may not be in inverse relation, e.g., such as with their totals representing a 100% probability determination, but rather, the first probability value and the second probability value may be separately determined by the liveness test model, and thus, a total of the first probability value and the second probability value may be representative of less than, equal, or greater than such a 100% probability determination.

In still another example, the liveness test apparatus may determine liveness of the object at a current time based on calculations performed by the liveness test model over time, thereby representing temporal characteristics into the liveness determination. For example, the liveness test model may include at least one recurrent connection structure formed among layers of a neural network model. Through such a recurrent connection structure, an output value of one layer calculated at the previous time may be used as an input value of that layer or another layer at the current time, such as through feedback connections, context nodes, or short term memory or gated nodes, and thus affect an output at the current time. Such recurrent connections may be weighted or non-weighted. The liveness test model having such a recurrent connection structure may be suitable for performing a liveness test taking into consideration successive image frames. At each time the liveness test is performed on each image frame, image information of an interest region extracted from an image frame and image information of the image frame of which a size is adjusted may be individually input, and internal calculations performed based on a previous image frame may affect the result of the liveness test for the current image frame. In such a case, the liveness test apparatus may perform a liveness test on an object intuitively, i.e., based on the training of the liveness test model, based on a movement characteristic of the object in temporally successive image frames, in addition to local texture information indicated in the interest region and global shape information indicated in an image frame. Here, when such calculations are performed by the example neural network, the internal calculations may be the application of weights to connections between nodes of different layers of the neural network, as well as operations and actuation functions of each of the nodes. During training, such weights and hyperparameters of the neural network may be selectively adjusted until the liveness test model is trained. An output layer of the neural network may be a final layer of the neural network, for example with nodes that respectively perform probability distribution operations across all the output nodes, e.g., through softmax functions. For example, the example neural network may have two output nodes, the outputs of which are respectively the aforementioned first and second probability values. When properly trained for the desired texture, global, or temporal considerations, the neural network may then intuitively perform the liveness test on the input image data based on the trained weights of the differing connections between the nodes within the neural network and the internal connection and architecture of the neural network, such as with the portion of the neural network that may have the recurrent connection structure. In addition, the training may include performing a training operation on one or more select layers of the neural network independently of training operations performed on other layers, either for an entire training of such layers or for intermediate training of the layers before such layers are collectively trained with other or remaining layers, as only examples. Here, though such recurrent and output structures of the example liveness test neural network have been discussed, other layer structures of the neural network will be discussed in greater detail further below.

Figure 3A:
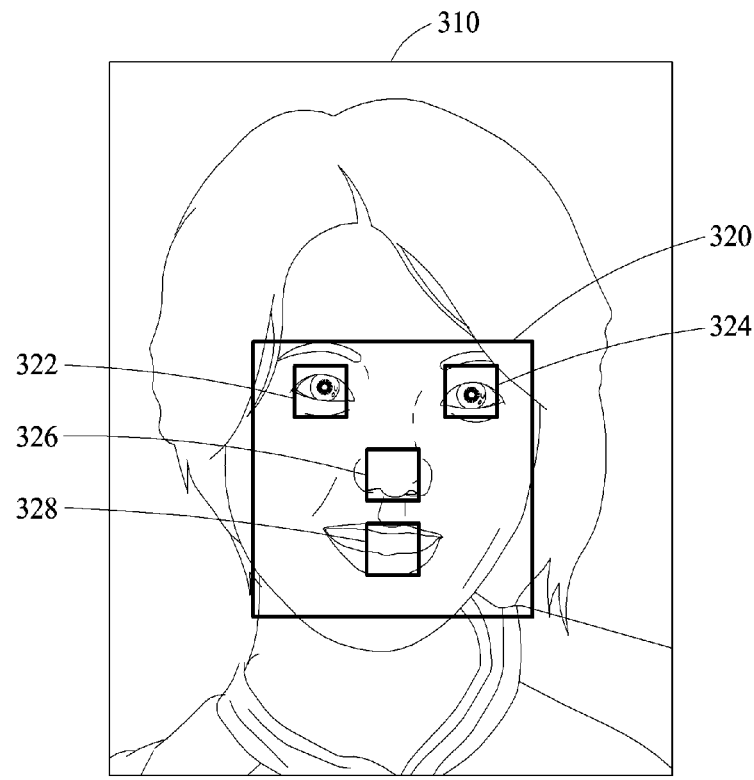
FIGS. 3A through 3D are diagrams illustrating examples of a method of extracting an interest region.

FIG. 3A is a diagram illustrating an example of a method of extracting an interest region when a face image 310 is input to a liveness test apparatus. Referring to FIG. 3A, the liveness test apparatus detects a face region 320 in the face image 310. In one example, the liveness test apparatus detects landmarks in the face image 310, and detect a bounding region including the detected landmarks as the face region 320. Alternatively, the liveness test apparatus may detect the face region 320 using a Viola-Jones detector, but examples are not limited to this specific example. In an example, the face region 320 may be determined so as to include substantially only the face region 320, such as excluding background information, i.e., information beyond or other than the object. The liveness test apparatus then extracts interest regions, for example, eye regions 322 and 324, a nose region 326, and a lips region 328, from the face region 320 to perform a liveness test. For example, the interest regions may include the eye regions 322 and 324, the nose region 326, and the lips region 328. The liveness test apparatus may extract the interest regions 322, 324, 326, and 328 based on locations of the landmarks, or using a visually salient region detecting method. In another example, the liveness test apparatus extracts the interest regions 322, 324, 326, and 328 without detecting the face region 320 in the face image 310.

Figure 3B:
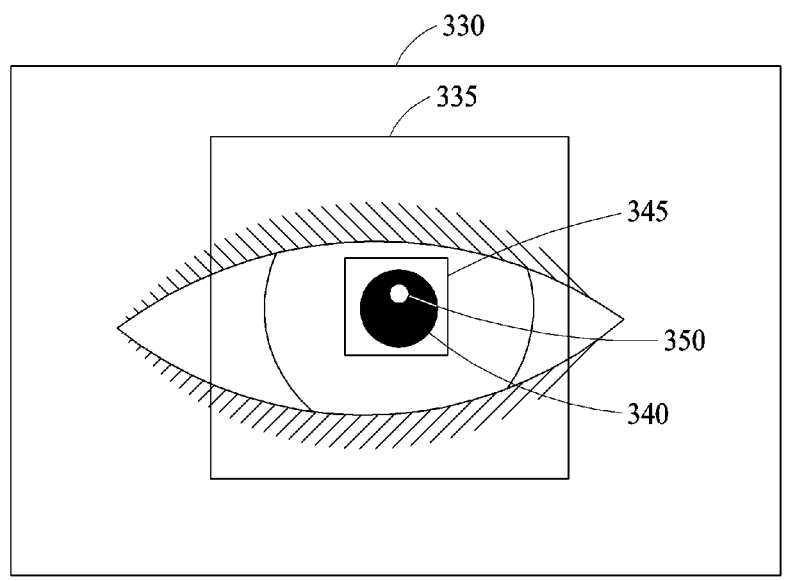

FIG. 3B is a diagram illustrating an example of a method of extracting an interest region when an eye image 330 is input to a liveness test apparatus. Here, for example, the eye image 330 may be determined so as to include substantially only an eye, eyes, or a face region, such as excluding background information. Referring to FIG. 3B, the liveness test apparatus detects an eye region 335 in the eye image 330. In one example, the liveness test apparatus detects the eye region 335 based on landmarks detected in an eye and a region around the eye. For example, the liveness test operation may include the detection of the landmarks from the eye image, as well as the detection of the eye and region around the eye based on the detected landmarks. The liveness test apparatus then extracts, from within the eye region 335, an interest region 345 in a form of a local patch including a pupil region 340. For example, the liveness test apparatus may detect the pupil region 340 during the landmark detection, based on the detected landmarks, or a circular edge detector, as only examples, and determine the interest region 345 including the detected pupil region 340. The interest region 345 may be determined so as to include substantially only the pupil region 340, for example. The pupil region 340 may include a detected corneal reflex 350 generated from a light source formed naturally or artificially, for example. The corneal reflex 350 and information of a region around the corneal reflex 350 may provide a clue for determining liveness of an object. The interest region or local patch may also be randomly selected from among plural eye or pupil regions.

Figure 3C:
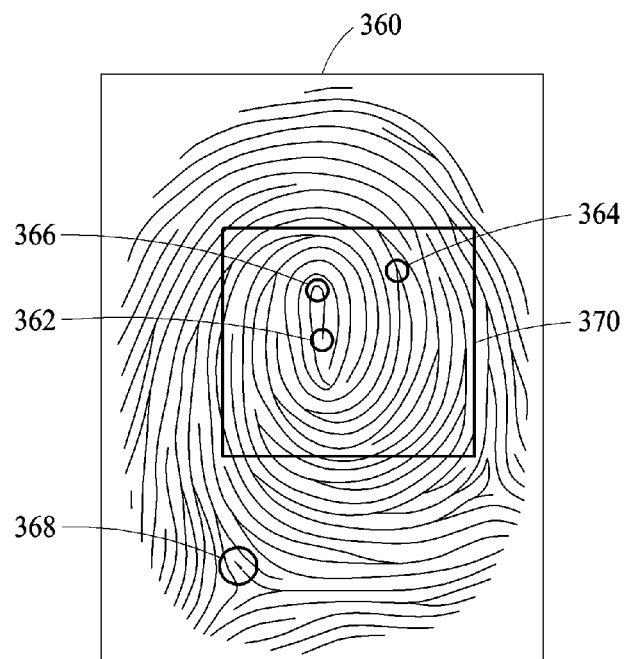

FIG. 3C is a diagram illustrating an example of a method of extracting an interest region when a fingerprint image 360 is input to a liveness test apparatus. Referring to FIG. 3C, the liveness test apparatus extracts feature points, for example, an ending point 362, a bifurcation point 364, a core point 366, and a delta point 368, from a ridge pattern of a fingerprint in the detected fingerprint image 360. A pattern and a shape of a distribution of such feature points may provide important information to determine liveness of an object. Accordingly, the liveness test apparatus may determine, to be an interest region 370, a select region within the fingerprint pattern in which the feature points are densely concentrated compared to other regions of the fingerprint pattern.

Figure 3D:
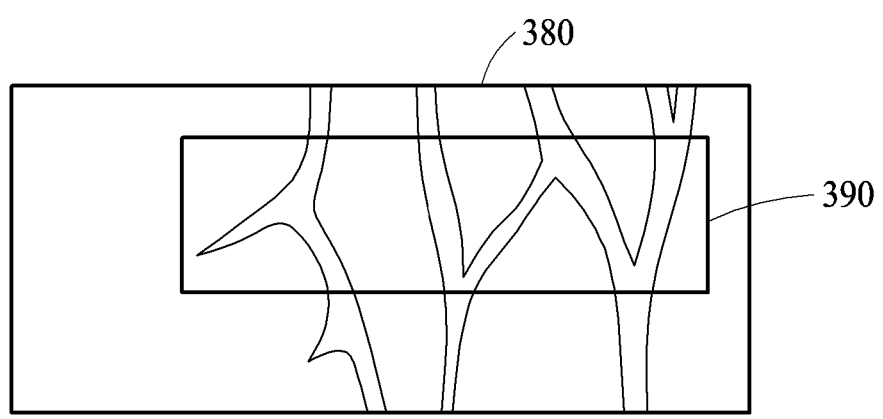

FIG. 3D is a diagram illustrating an example of a method of extracting an interest region when a detected or captured vein image 380 is input to a liveness test apparatus. Referring to FIG. 3D, the liveness test apparatus extracts a vein pattern from the vein image 380. The liveness test apparatus extracts feature points, for example, an end point and a bifurcation point of a blood vessel in the vein pattern, and determines, to be an interest region 390, a select portion of an entire region of the vein pattern in which the feature points are densely concentrated distinguished from other regions of the vein pattern.

Figure 4A:
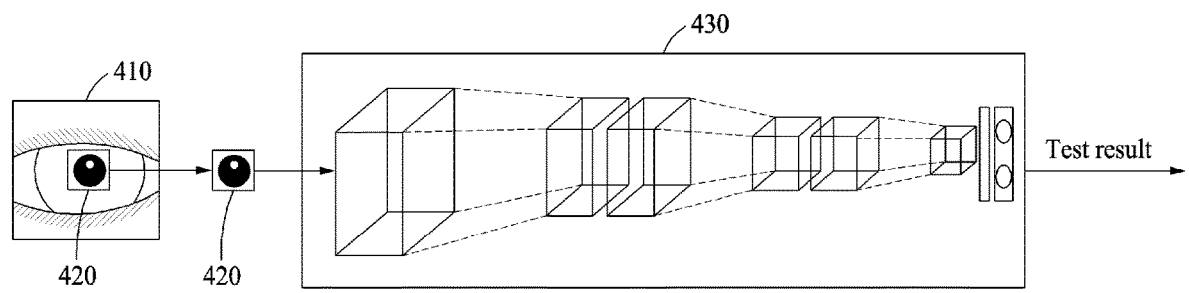
FIG. 4A is a diagram illustrating an example of a liveness test method.

FIG. 4A is a diagram illustrating an example of a liveness test method.

Referring to FIG. 4A, a liveness test apparatus detects a global region 410 in an input image, and extracts an interest region 420 in a form of a local path from the global region 410. In iris recognition, the liveness test apparatus detects the global region 410 indicating a select eye region in the input image, and extracts the interest region 420 including a pupil region from the global region 410. For example, when a size of the global region 410 is a 200×200 pixel size, when the liveness test apparatus extracts the interest region 420 from the global region 410, the results may be a 64×64 pixel size image including the pupil region from the global region 410. For another example, the liveness test apparatus may extract the interest region 420 immediately from the input image without detecting the global region 410. The liveness test apparatus may extract the interest region 420 without resolution adjustment, or slight resolution enhancement or down-scaling may be performed depending on the pixel dimensions expected by the input of the liveness test apparatus. The liveness test apparatus may also alternatively control the proportion of the pupil in the extracted interest region, without resolution adjustment, so the final pixel dimensions of the extracted interest region 420 correspond to the pixel dimensions expected by the liveness test apparatus. As an example, the extracted interest region 420 may be input to the liveness test apparatus as a matrix, e.g., with pixel columns and rows corresponding to element columns and rows of the matrix, or as a three-dimensional box with example red, green, and blue color pixel values for each pixel being respectively reflected in the depth of the box.

The liveness test apparatus obtains a result of a liveness test performed on an object from image information of the interest region 420 using a trained deep convolutional neural network (DCNN) model-based liveness test model 430. Layers of a DCNN model may be classified based on a function of each layer, and the DCNN model may include a convolutional layer configured to extract features through a convolution performed on the input image, a pooling layer configured to perform abstraction to map a plurality of pixels or values from a previous layer to a lesser number of pixels or values or a single pixel or value, and a fully-connected layer configured to classify features transferred from a lower layer. The fully-connected or dense layer may include multiple fully-connected or dense layers. There may be multiple convolution layers which respectively perform convolutional filtering, for example, on connected results from a previous layer, e.g., with the convolutional layers each outputting three-dimensional boxes whose dimensions may depend on the filter size of the corresponding convolutional layer. In addition, there may be weighted connections to each convolutional layer in correspondence to each pixel of the corresponding convolutional layer and for each filter of the corresponding convolutional layer. Through convolution of multiple filters across the pixels in each convolution layer, due to the respective configurations of each convolution layer, distinguishing features of input (from the previous layer or input layer) image may be recognized. The DCNN may further include multiple pooling layers that may each respectively downsample input pixels or three-dimensional boxes from a previous layer, such as without weighting, for example. In the example of FIG. 4A, the DCNN model-based liveness test model 430 thus illustrates an example first convolution layer, then operations of a following first pooling layer are represented by the hashed lines, where the three-dimensional box output from the first convolution layer is downsampled to a smaller three-dimensional box, and provided to a second convolutional layer, whose output is provided to a third convolutional layer. Operations of a following second pooling layer are again represented by hashed lines, where the downsampled three-dimensional box is then provided to a fourth convolutional layer, whose output is provided to a fifth convolutional layer, and whose output is again downsampled by a third pooling layer and provided to the illustrated sixth convolutional layer. The sixth convolutional layer is connected to the illustrated fully-connected or dense layer, which is finally connected to the illustrated two output node output layer. The outputs of the nodes of the illustrated output layer may then be provided as the illustrated test result. Through training of the DCNN model-based liveness test model 430, the weighted connections between the different layers may be set. For example, the DCNN model-based liveness test model 430 may be trained based on a number of sample training images, e.g., with such interest region extraction, global region extraction, and temporal application, with the weightings being adjusted through multiple iterations, such as through backpropagation training, until the DCNN model-based liveness test model 430 accurately discerns between live and non-live input images. Accordingly, DCNN model-based liveness test model 430 may provide information to be used to determine liveness of the object based on the image information input to the liveness test model 430 through internal computations and operations using the convolutional layer, the pooling layer, and the fully-connected layer. Further detailed descriptions of the structure and function of the DCNN model are omitted here, though it is noted that alternative configurations are also available. Further, the DCNN model is provided as an illustrative example only, and the liveness test model 430 may be based on an alternate neural network model of a structure other than the DCNN model. In addition, through repetition of at least another input layer, another first convolutional layer, and another first pooling layer, and results thereof combined with results from above noted first pooling layer, further interest regions may be concurrently evaluated for a same liveness determination, such as discussed below with regard to the combination of convolution results for the downsized image 440 with convolution results for the interest region in FIG. 4B.

Figure 4B:
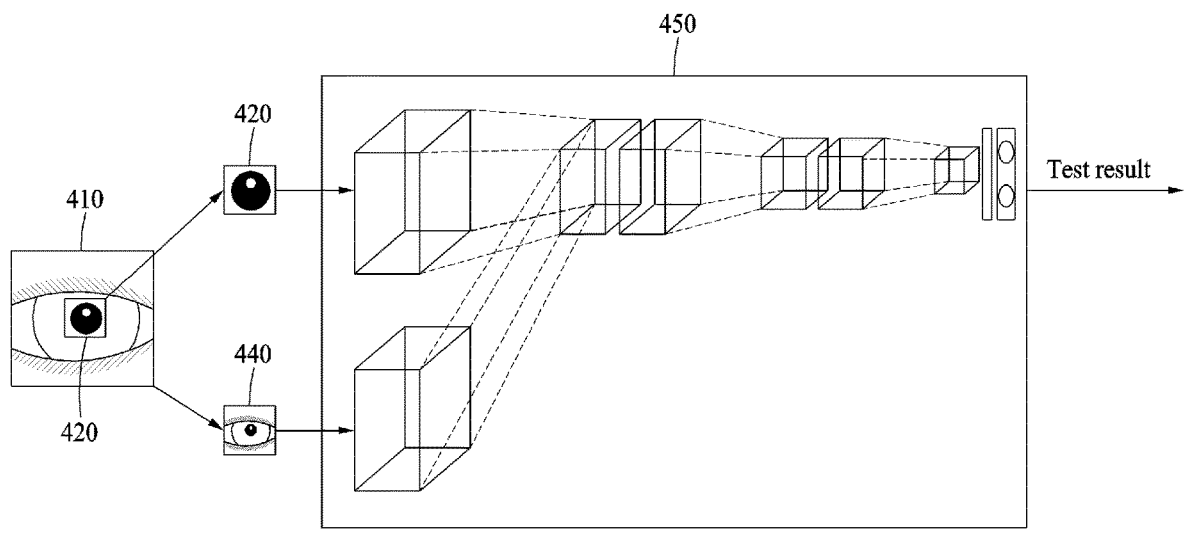
FIG. 4B is a diagram illustrating an example of a liveness test method.

FIG. 4B is a diagram illustrating another example of a liveness test method.

Referring to FIG. 4B, similarly to the example illustrated in FIG. 4A, a liveness test apparatus detects a global region 410 in an input image and extracts an interest region 420 from the global region 410. In addition, the liveness test apparatus generates a downscaled image 440 obtained by scaling down a size of the global region 410. For example, when the size of the global region 410 is a 200×200 pixel size, the liveness test apparatus may extract the interest region 420 of a 64×64 pixel size from the global region 410 through image cropping, and generate the downscaled image 440 of a 64×64 pixel size from the global region 410 through sub-sampling. Here, the effective resolution of the interest region 420 may be maintained, e.g., be equal to the effective resolution of the global region 410, while due to the downscaling or downsampling of the global region the effective resolution of the downscaled image 440 may be less than the effective resolution of the global region 410. Thus, due to the downscaling or downsampling of the global region, the downscaled image 440 includes less information and detail than the original global region 410, though still demonstrating spatial information of the global region. The interest region 420 may be used to identify a delicate texture difference while reducing an amount of computation or operations, e.g., compared to an entire captured image of a user, and the downscaled image 440 may be used to identify an overall shape difference while reducing an amount of computation or operations, again, compared to if such a test were performed on the entire captured image of a user. Alternatively, the liveness test apparatus may extract the interest region 420 immediately from the input image without detecting the global region 410, and generate the downscaled image 440 by scaling down the input image.

Image information of the interest region 420 and image information of the downscaled image 440 are input to a DCNN model-based liveness test model 450 through different input layers of the liveness test model 450. Similar to above, the downscaled image 440 may be input to an input layer that connects to a seventh convolution layer, and whose output is downsampled by a fourth pooling layer and provided to the second convolutional layer. The fourth pooling layer may downsample the three-dimensional box output from the seventh convolution layer so the downsampled three-dimensional box matches in dimensions the downsampled three-dimensional box provided by the first pooling layer, for example. These two downsampled three-dimensional boxes may thus both have connections to the second convolution layer, such as so like positioned elements connect to the same nodes of the second convolution layer to implement an element-wise summation, for example. In this example, the first convolutional layer may have a select convolutional structure and be trained for extracting certain characteristic(s) of the interest region 420, for example, and thus may have a different structure and/or be differently trained than the seventh convolutional layer. The first and seventh convolutional layers may also be trained together, as described above using the interest region 420 and corresponding downscaled image 440. Thus, as only an example, the convolutional filtering by the first convolutional layer for the interest region 420 and the convolutional filtering by the seventh convolutional layer for the downscaled image 440 may be different. Also, similar to the liveness test model 430, each of the subsequent convolutional layers may also have distinct structures and objectives, for an ultimate liveness detection determination, e.g., in combination with the remaining non-convolutional layers of the liveness test model 450. Likewise, similar or same convolutional filters may also be included in different convolutional layers. Thus, the liveness test apparatus determines liveness of an object based on an output value of the liveness test model 450, for example, to which the image information of the interest region 420 and the image information of the downscaled image 440 are input.

Alternatively, image information of the global region 410 that is not scaled down or image information of the input image may be input to the liveness test model 450 as an input, and the image information of the interest region 420 may be input to the liveness test model 450 as another input. As only an example, the seventh convolutional layer and fourth pooling layer may be configured for at least respective spatial feature discrimination and sampling and for subsequent cooperation with outputs of the first pooling layer after the first convolutional layer that discriminates textural information of the interest region 420. The liveness test model 450 may output a result of a test to determine the liveness of the object based on the input image information.

Figure 5:
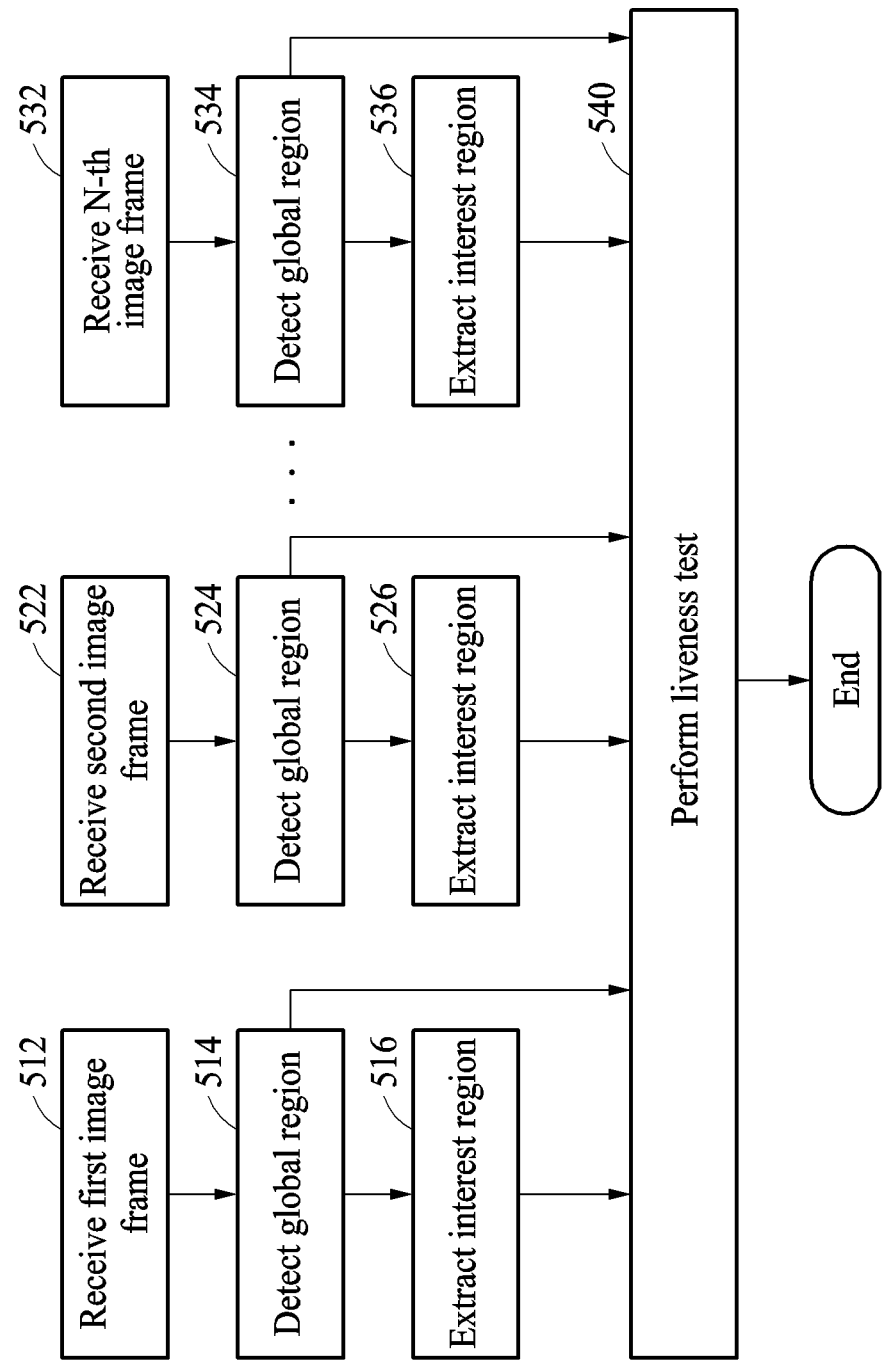
FIGS. 5 and 6 are diagrams illustrating examples of a liveness test method.

FIG. 5 is a diagram illustrating still another example of a liveness test method.

A liveness test apparatus may perform a liveness test on temporally successive image frames. The liveness test apparatus may thus perform a liveness test on an object based further on a movement characteristic of the object based on a lapse of time that is indicated in the image frames, in addition to a texture characteristic and a shape characteristic indicated in each image frame. The liveness test apparatus may detect liveness of the object more accurately by determining the liveness based on a temporal characteristic such as the movement characteristic of the object, in addition to a spatial characteristic of an image frame such as the texture characteristic and the shape characteristic.

Referring to FIG. 5, in stage 512, the liveness test apparatus receives a first image frame. The liveness test apparatus detects a global region in stage 514, and extracts an interest region from the global region in stage 516. In stage 540, the liveness test apparatus performs a liveness test on an object in the first image frame using a liveness test model. For example, image information of the interest region and image information of a downscaled image obtained by scaling down the global region may be input to the liveness test model.

Subsequently, a second image frame, which is a subsequent image frame of the first image frame, is input to the liveness test apparatus, and the liveness test apparatus performs a liveness test on an object in the second image frame. In stages 522 through 526, the liveness test apparatus receives the second image frame and detects a global region from the second image frame, and extracts an interest region from the detected global region. In stage 540, the liveness test apparatus performs the liveness test on the object in the second image frame based on calculations performed by the liveness test model from the first image frame, in addition to the image information of the interest region and the image information of the downscaled image obtained by scaling down the global region. The liveness test apparatus repeats the stages described in the foregoing for each subsequent image frame to perform a liveness test on an N-th image frame through stages 532, 534, 536, and 540.

The liveness test model may implement this temporal consideration using the aforementioned recurrent connection structure where the liveness test model operates as having memory or context of the previous operations and previous images for subsequent operations and subsequent images. For example, with such a recurrent connection structure, calculated values of the liveness test model derived in a previous liveness test operation performed on a previous image frame may affect a liveness test to be performed on a current image frame. As noted above, in a neural network example, the recurrent structure may be represented by outputs of nodes of one layer being connected back to the same layer, being fed back to a previous layer, provided to a context layer or node for subsequent output, or implemented by nodes having short term or gated memories, as only example. The recurrent connection structure of the liveness test model may vary based on examples. For example, based on a shape of the recurrent connection structure, a result of the liveness test to be performed on the current image frame may be affected only by a result of the liveness test performed on one previous image frame, a select number of previous image frames, or by a result of liveness tests performed on all image frames presented at or since a previous time.

Figure 6:
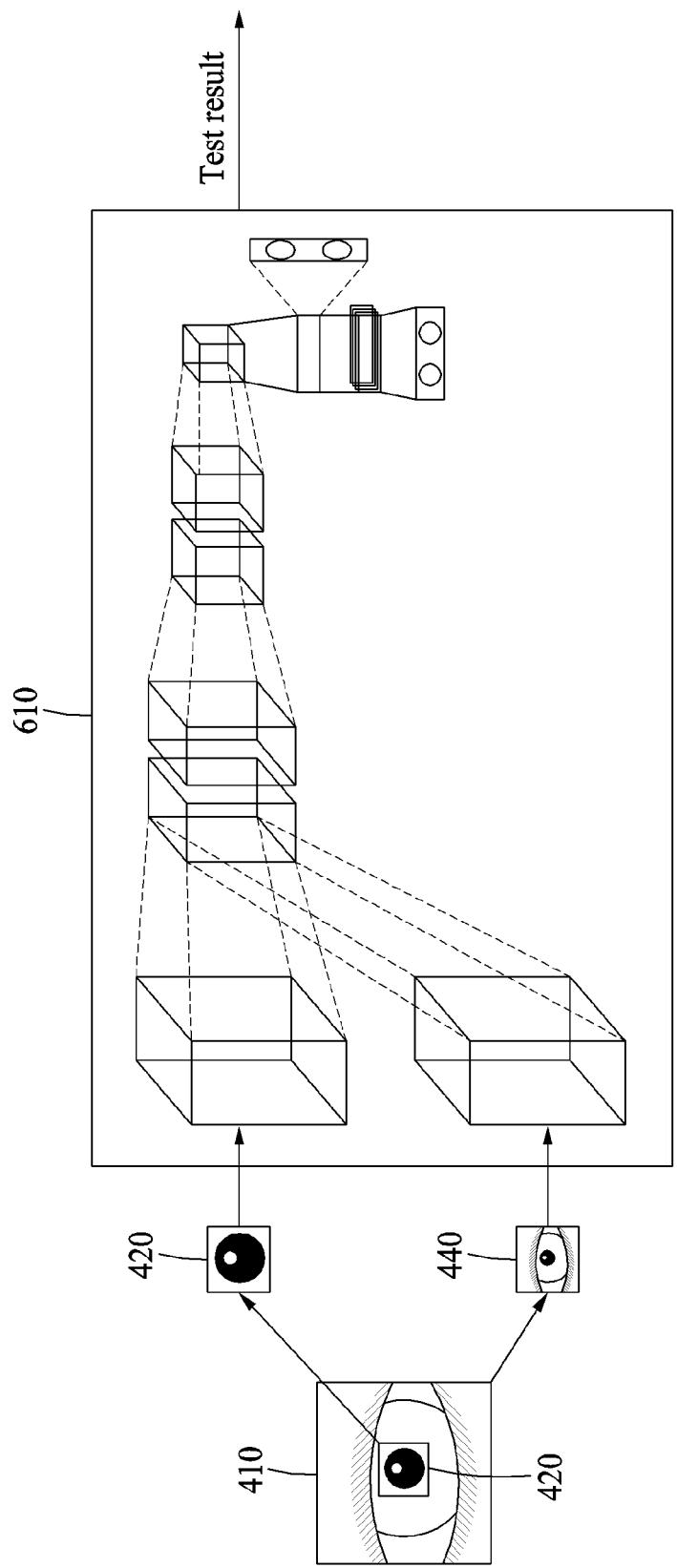

FIG. 6 is a diagram illustrating an example of the liveness test method described with reference to FIG. 5.

Referring to FIG. 6, similarly to the example illustrated in FIG. 4B, a liveness test apparatus detects a global region 410 in an input image, for example, an image frame, and extracts an interest region 420 from the global region 410. In addition, the liveness test apparatus generates a downscaled image 440 obtained by scaling down a size of the global region 410. Alternatively, the liveness test apparatus extracts the interest region 420 immediately from the input image without detecting the global region 410, and generates the downscaled image 440 by scaling down the input image.

Image information of the interest region 420 and image information of the downscaled image 440 may be input to a liveness test model 610 through different input layers of the liveness test model 610. The liveness test apparatus obtains a result of a liveness test performed on an object from the image information of the interest region 420 and the image information of the downscaled image 440 using the liveness test model 610. Thus, in addition to the configurations of FIGS. 4A and 4B, the example fully-connected or dense layer of FIG. 6 may include multiple fully-connected or dense layers that include the above example recurrent structures, as well as two output layers. The liveness test model 610 may have such a recurrent connection structure in which a previous calculated values of the liveness test model 610 with respect to interest region 420 and downscaled image 440 of previous frames are input to a layer of the liveness test model 610 that is implementing the liveness test with respect to the interest region 420 and downscaled image 440 of a current frame at a current time. Accordingly, the liveness test model 610, which is provided in a neural network structure, may include one or more layers configured to extract a texture features of each image frame, one or more layers configured to extract spatial features of each image frame, and one or more layers configured to extract temporal features of the object that changes over time, and perform a liveness test based on all of the texture, spatial, and temporal features obtained by the corresponding layers.

Figure 7:
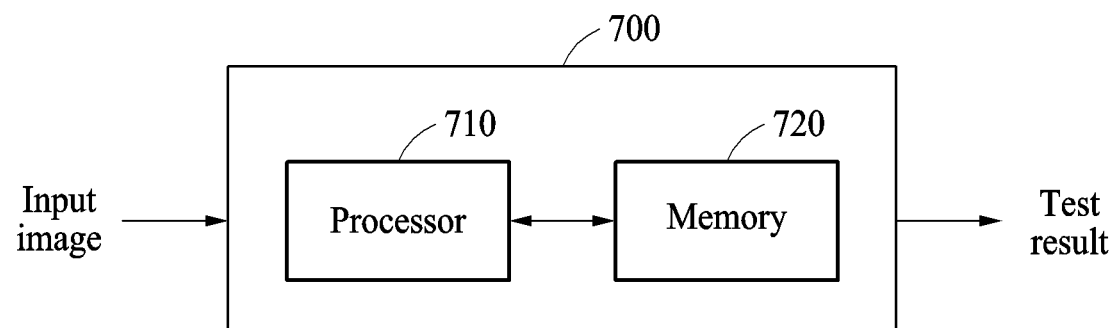
FIG. 7 is a diagram illustrating an example of a liveness test apparatus.

FIG. 7 is a diagram illustrating an example of a liveness test apparatus 700. The liveness test apparatus 700 may perform a liveness test on an object in an input image, and output a result of the liveness test. Referring to FIG. 7, the liveness test apparatus 700 includes a processor 710 and a memory 720.

The processor 710 performs one or more or all operations or stages described with reference to FIGS. 1A through 6. For example, the processor 710 may extract an interest region from the input image, and perform the liveness test on the object in the input image using a liveness test model that uses image information of the interest region as a first input. According to an example, the liveness test model may use, as a second input, image information of a global region or a downscaled image of the global image, in addition to the image information of the interest region. The liveness test model may have a recurrent connection structure that is affected by a result of previous calculations for previous frames.

When the object in the input image is determined to be a fake object, the processor 710 may generate a signal corresponding to a failure in the liveness test. In such a case, recognition or authentication of the object may be immediately determined to be unsuccessful, and the processor 710 may cease authentication operations, and thus not implement further recognition or authentication on the object, such as full facial recognition of the user. Conversely, when the object in the input image is determined to be a live object, the processor 710 may generate a signal corresponding to a success in the liveness test. In such a case, the processor 710 may implement further recognition or authentication on the object, such as by using the previously captured image(s) for facial recognition or a new image may be captured. Alternatively, if the object in the input image is determined to be a live object, the processor 710 may not implement further recognition or authentication and merely enable the user access to further functions of the processor, enable the user to obtain access to a restricted or controlled area, or enable the user access to financial services or authorized payment, such as through a mobile payment system represented by the processor 710. As noted, when liveness of the object is determined, a series of stages for further recognition or authentication may be performed on the object. However, when the liveness of the object is not determined, such further recognition or authentication may not be performed on the object, and all the stages may be terminated. In addition, the processor 710 may perform training of a liveness test model, such as the above discussed DCNN model-based liveness test model. For example, the training may be performed through backpropagation training the DCNN model-based liveness test model based on capturing such interest regions from input images or determined global images of such input images from labeled training data images, for example. The training data may include images, e.g., live images, of a user of the liveness test apparatus 700 and/or corresponding presorted/labeled training images from a general collection of people and/or select groups of people, as only non-limiting examples.

The processor 710 may be embodied as an array of a plurality of logic gates, or have other hardware processing configurations, depending on embodiment. As only examples, the processor 710 may include multiple processor cores or be representative of a multi-processor system of cluster, or the processor 710 may be a multi-core graphics processor unit (GPU), again noting that alternatives are available.

The memory 720 stores instructions to perform one or more or all operations or stages described with reference to FIGS. 1A through 6, and/or stores results of calculations performed by the liveness test apparatus 700. The memory 720 may include a non-transitory computer-readable medium, for example, a high-speed random access memory (RAM) and/or a nonvolatile computer-readable storage medium (for example, at least one disk storage device, flash memory device, or other nonvolatile solid-state memory device). In addition, the memory 720 may store parameters of the liveness test model, such as pre-trained weights for a DCNN model-based liveness test model, as discussed above.

Figure 8:
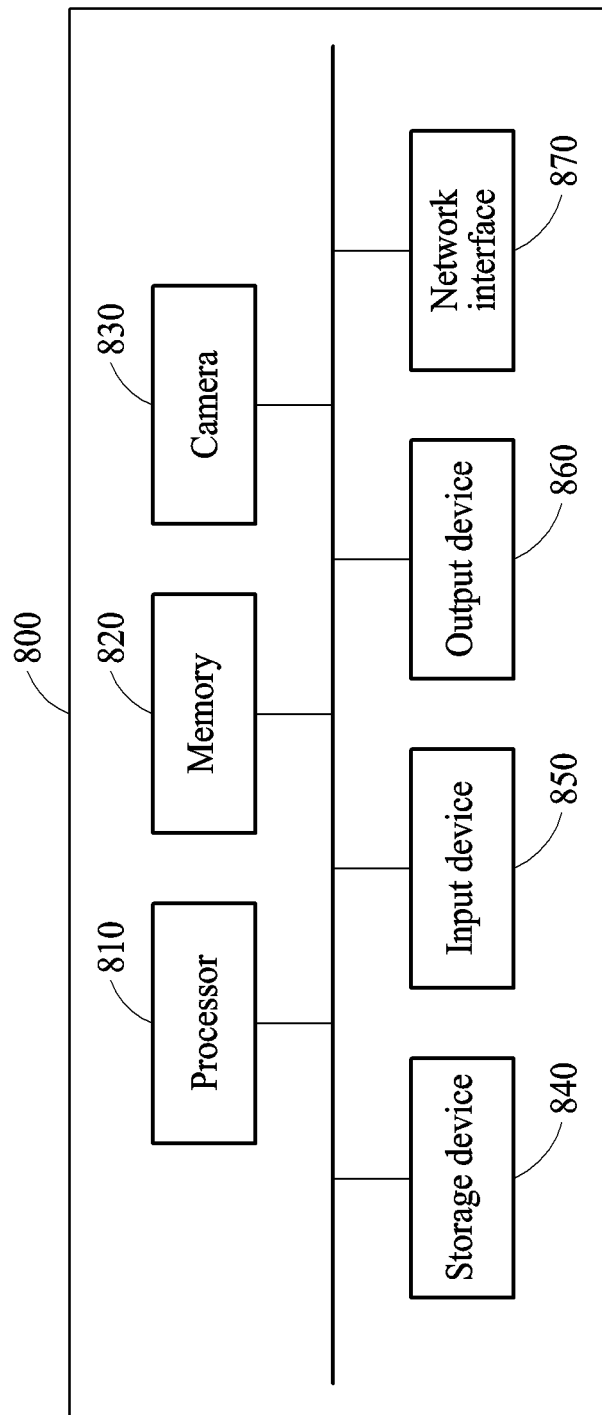
FIG. 8 is a diagram illustrating an example of a computing apparatus.

FIG. 8 is a diagram illustrating an example of a computing apparatus 800.

The computing apparatus 800 may perform a liveness test on an object in an input image, and perform user authentication. The computing apparatus 800 may include a function of the liveness test apparatus 700 described with reference to FIG. 7. Referring to FIG. 8, the computing apparatus 800 includes a processor 810, a memory 820, a camera 830, a storage device 840, an input device 850, an output device 860, and a network interface 870, for example.

The processor 810 performs a function and executes instructions to operate in the computing apparatus 800. For example, the processor 810 processes instructions stored in the memory 820 or the storage device 840. The processor

810 is configured to perform one or more or all operations or stages described above with respect to FIGS. 1A through 6. In addition, the processor 810 is configured to control other functions of the computing apparatus 800. For example, the computing apparatus may be mobile device, such as a mobile phone, tablet, or personal computer, and thus the processor 810 is further configured to implement other typical functions of the computing apparatus 800.

The memory 820 stores information in the computing apparatus 800. The memory 820 includes a computer-readable storage medium or a computer-readable storage device. The memory 820 may include, for example, a RAM, a dynamic RAM (DRAM), a static RAM (SRAM), and other types of a nonvolatile memory known in the art to which the examples described herein belong. In addition, memory 820 is further representative of multiple such types of memory. The memory 820 also stores the instructions to be executed by the processor 810 and stores related information during operations of software or an application performed by the computing apparatus 800.

The camera 830 obtains a still image, a video image, or both of the images. In an example, the camera 830 captures a face region or an iris region that is input by a user for user authentication. In addition, as noted above, the camera 830 may also be controlled by the processor 810 during other functions of the computing apparatus 800, such as when operated as a personal camera.

The storage device 840 includes a computer-readable storage medium or a computer-readable storage device. The storage device 840 stores a greater amount of information than the memory 820, and stores the information for a long period of time. The storage device 840 includes, for example, a magnetic hard disk, an optical disk, a flash memory, and an electrically erasable programmable read-only memory (EPROM), a floppy disk, and other types of a nonvolatile memory known in the art to which the examples described herein belong.

The input device 850 receives an input from the user, for example, a tactile input, a video input, an audio input, and a touch input. The input device 850 detects the input from, for example, a keyboard, a mouse, a touchscreen, a microphone, a fingerprint reader, a retina scanner, and the user, and includes another device configured to transfer the detected input to the computing apparatus 800.

The output device 860 provides the user with an output of the computing apparatus 800 through a visual, audio, or tactile channel. The output device 860 includes, for example, a liquid crystal display (LCD), a light-emitting diode (LED) display, a touchscreen, a speaker, a vibration generator, or another device configured to provide the user with the output.

The network interface 870 communicates with an external device through a wired or wireless network. The network interface 870 includes, for example, an Ethernet card, an optical transceiver, a radio frequency transceiver, or another network interface card configured to transmit or receive information. The network interface 870 communicates with an external device using Bluetooth, WiFi, or a third generation (3G), fourth generation (4G), or fifth generation (5G) communication method. The network interface 870 may further include a near field transceiver or the like. For example, through control of the processor 810 upon authentication of a user, the near field transceiver may transmit a payment authorization to an external terminal, such as with an appropriate mobile payment instruction transmitted by the near field transceiver. In addition, the processor 810 may control the network interface 870 to routinely check for updates for the liveness test model, and request, receive, and store parameters or coefficients of the same in the memory 820. For example, when the liveness test model is the above example DCNN model-based liveness test model, the processor 810 may request, receive, and store updated weighting matrices for the DCNN model-based liveness test model. In addition, updated hyper-parameters that can control or alter the configuration or architecture of the DCNN model-based liveness test model may also be requested, received, and stored along with corresponding weighting matrices.

The computing apparatus 120, camera 130, display 125, home button 170, computing apparatus 180, liveness test apparatus, processor 710, memory 720, computing apparatus 800, liveness test apparatus 700, processor 810, memory 820, camera 830, storage device 840, input device 850, output device 860, and network device 870 in FIGS. 1A-8 and that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 1A-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented liveness test method, the liveness test method comprising:
    extracting an interest region in a face region of a user by cropping the interest region from an input image;
    generating a down-sampled image from the input image; and
    performing a liveness test on a face of the user based on the interest region and the down-sampled image by inputting the interest region and the down-sampled image to input layers of a neural network model-based liveness test model,
    wherein a result of the liveness test is determined based on an output of the neural network model-based liveness test model.

2. The method of claim 1, wherein the extracting comprises extracting a portion including at least one of an eye, a nose, and lips from the face region of the user in the input image, as the interest region.

3. The method of claim 1, wherein the extracting comprises:
    detecting facial landmarks in the face region; and
    extracting the interest region based on the facial landmarks detected in the face region.

4. The method of claim 3, wherein the interest region is smaller than the face region.

5. The method of claim 1, wherein the liveness test model outputs a reference value to determine a liveness based on local texture information indicated in the interest region.

6. A non-transitory computer-readable storage medium storing instructions, that when executed by a processor, cause the processor to perform the method of claim 1.

7. A liveness test computing apparatus comprising:
    one or more processors configured to:
    extract an interest region in a face region of a user by cropping the interest region from an input image;
    generate a down-sampled image from the input image; and
    perform a liveness test on the face based on the interest region and the down-sampled image by inputting the interest region and the down-sampled image to input layers of a neural network model-based liveness test model, wherein a result of the liveness test is determined based on an output of the neural network model-based liveness test model.

8. The liveness test computing apparatus of claim 7, wherein the one or more processors are further configured to extract a portion including at least one of an eye, a nose, and lips from the face region of the user in the input image, as the interest region.

9. The liveness test computing apparatus of claim 7, wherein the liveness test model outputs a reference value to determine a liveness based on local texture information indicated in the interest region.

10. The liveness test computing apparatus of claim 7, wherein the one or more processors are further configured to:
detect facial landmarks in the face region; and
extract the interest region based on the facial landmarks detected in the face region.

11. The liveness test computing apparatus of claim 10, wherein the interest region is smaller than the face region.

\* \* \* \* \*